Oct. 26, 1971  N. J. PERRELLI  3,614,941

GLUE POT

Filed Oct. 3, 1967  5 Sheets-Sheet 1

INVENTOR.
NICHOLAS J. PERRELLI
BY
Joseph P. Gastel
ATTORNEY

Oct. 26, 1971   N. J. PERRELLI   3,614,941
GLUE POT

Filed Oct. 3, 1967   5 Sheets-Sheet 2

INVENTOR.
NICHOLAS J. PERRELLI
BY
Joseph P. Gastel
ATTORNEY

Oct. 26, 1971   N. J. PERRELLI   3,614,941
GLUE POT

Filed Oct. 3, 1967   5 Sheets-Sheet 3

INVENTOR.
NICHOLAS J. PERRELLI
BY
Joseph P. Gastel
ATTORNEY

INVENTOR.
NICHOLAS J. PERRELLI
BY
Joseph P. Gastel
ATTORNEY

United States Patent Office 3,614,941
Patented Oct. 26, 1971

3,614,941
GLUE POT
Nicholas J. Perrelli, 131 Woodward Drive,
West Seneca, N.Y. 14224
Filed Oct. 3, 1967, Ser. No. 672,590
Int. Cl. B05c 1/00
U.S. Cl. 118—255                                      2 Claims

ABSTRACT OF THE DISCLOSURE

A glue pot having a pick-up roller partially submerged in a glue tub and a metering roller which can be adjusted relative thereto to vary the film thickness of glue on the pick-up roller. These rollers rotate in opposite directions so as to suck up glue from the tub. First and second applying rollers, which apply the glue to a workpiece, are mounted on the frame, and the first applying roller and the pick-up roller travel in counter-wiping relation. The second applying roller travels in counter-wiping relationship to the first. The applying rollers can be used to apply glue to a workpiece which is either above or below the frame. All of the supporting structure for the rollers is mounted in ball bearings having suitable structure associated therewith for shielding them against the entry of glue. All of the rollers can be mounted either on the right side or left side of the frame to provide either right or left handed operation. The rollers are driven by a cable drive through a slip-clutch which will permit the glue pot to stall when a foreign object interferes with proper operation thereof. A universal mounting permits the frame carrying the rollers to be placed at any desired orientation relative to the machine on which it is mounted.

BACKGROUND OF THE INVENTION

The present invention relates to an improved glue pot for applying glue to a rapidly traveling workpiece in a carton making machine or the like.

By way of background, glue pots, which are glue applying devices, are mounted on paper carton making machines to apply the glue to various portions of the carton which are subsequently placed in lapped relationship and secured by said glue to form the carton. These machines may produce in excess of fifty thousand cartons per hour. In the past, glue pots were highly inefficient and subject to rapid deterioration in use. In this respect, the glue would enter the working parts of the glue pot, and when it dried it would cause moving parts of the glue pot to be cemented to each other. This would either cause the entire carton making machine to jam or place an abnormally high load on the driving motor. Because of the load which the glue pot provided, a high torque was required to drive it, and any foreign object which interfered with its movement was run through the glue pot. This was a safety hazard. In addition, when the glue pot had to be disassembled for repair or cleaning, the procedure required numerous hours, or even days, which was reflected in corresponding down time of the machine with which it was associated. Furthermore, the glue pot could be mounted only on a specified predetermined portion of a machine and it had very little latitude of movement on the machine, and the glue could not always be located in an optimum location. In addition, the adjusting of prior glue pots was a difficult and time-consuming procedure. Furthermore, during operation prior glue pots sprayed glue onto other machine parts and the cartons being fabricated, and also beat air into the glue which caused it to foam and overflow. It is with the overcoming of the foregoing shortcomings of prior glue pots that the present invention is concerned.

SUMMARY OF THE INVENTION

It is accordingly one object of the present invention to provide an improved glue pot in which all of the moving parts are mounted in ball bearings which are shielded against the entry of glue and which therefore produces very little torque resistance against being driven and which does not require extensive disassembly for cleaning. A related object of the present invention is to provide an improved glue pot having its moving parts mounted in ball bearings which can be driven through the slip-clutch or like device because it requires very little driving force and which therefore will stop when a foreign body interferes with proper operation thereof. A further related object of the present invention is to provide an improved glue pot which can be driven by a flexible cable drive so that the glue pot can easily be moved to any convenient location on the machine without disrupting the drive thereto or requiring complicated linkages for effecting a proper driving relationship in various positions. A further related object of the present invention is to provide an improved glue pot which can utilize a universal mounting which permits it to be mounted at any convenient portion of a machine and in any desired orientation for effecting a proper deposit of glue.

Another object of the present invention is to provide an improved glue pot in which all of the rollers which are used for moving glue are mounted on shafts having their axes fixed so that adjustment of these shafts relative to each other is not necessary, and which utilizes a metering roll for adjusting the thickness of film of glue which is to be applied, the metering roll being movable to any desired adjusted position quickly and easily without the use of tools.

Another object of the present invention is to provide an improved glue pot in which the parts can be reoriented relative to the frame thereof simply and rapidly and so as to provide right-hand or left-hand operation, as required, for any specific workpiece. A related object of the present invention is to provide an improved glue pot which can be located below or above a workpiece and provide a dependable transfer of glue to either workpiece with equal facility. Other objects and attendant advantages of the present invention will readily be perceived hereafter.

The improved glue pot of the present invention includes a frame which is adapted to be mounted on an associated carton making machine. A glue tub is mounted on the frame and partially submerged therein is a ball bearing mounted pick-up roller which rotates in an opposite direction than a metering roller adjacent thereto. This causes the glue to be picked up or sucked up from the glue tub without the entrainment of air thereby eliminating foaming which could cause the glue to overflow. The glue is transferred to a ball bearing mounted glue applying roller which travels in counter-wiping relationship relative to the pick-up roller, thereby eliminating spraying of the glue. Another glue applying roller travels in glue receiving counter-wiping relationship relative to the first roller so that the first roller functions as a transfer roller in the event the second roller is used to apply glue to a workpiece. The first roller is used to apply the glue to a workpiece above the frame whereas the second applies it to one below the frame. All of the rollers and the tub are mounted so that they can be removed from a first side of the housing and easily mounted on the second side thereof, thereby permitting the glue pot to be used for right-hand or left-hand operation. In addition, the ball bearings are shielded against entry of glue, thereby obviating the necessity for disassembling the machine when cleaning is required, this cleaning being effected merely by removing the glue tub and wiping the various wheels and rollers with a suitable solvent. The frame includes an universal mounting which permits it to be mounted at any desired portion of a carton making machine in any desired attitude for optimum operation. In addition, the mechanical drive to the glue pot may be through a cable drive and a slip-clutch, the cable drive enchancing the latitude of placement of the glue pot and the slip-clutch permitting the glue pot to stop incidental to interference therewith by a foreign body. The present invention will be more fully understood when the following portions of the specification are read in conjunction with the accompanying drawings wherein:

DESCRIPTION OF THE PREFERRED EMBODIMENTS

Figure 2:
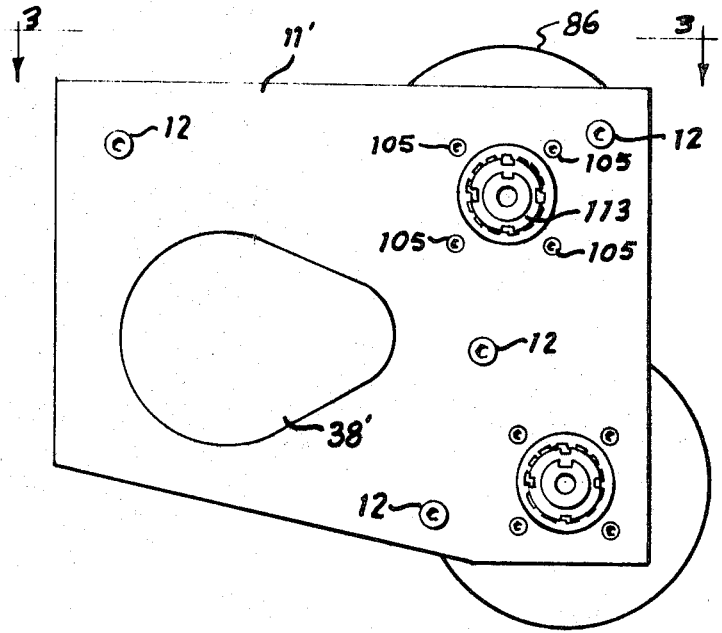
FIG. 2 is a side elevational view of the device in the direction of line 4—4 of FIG. 3.
Figure 3:
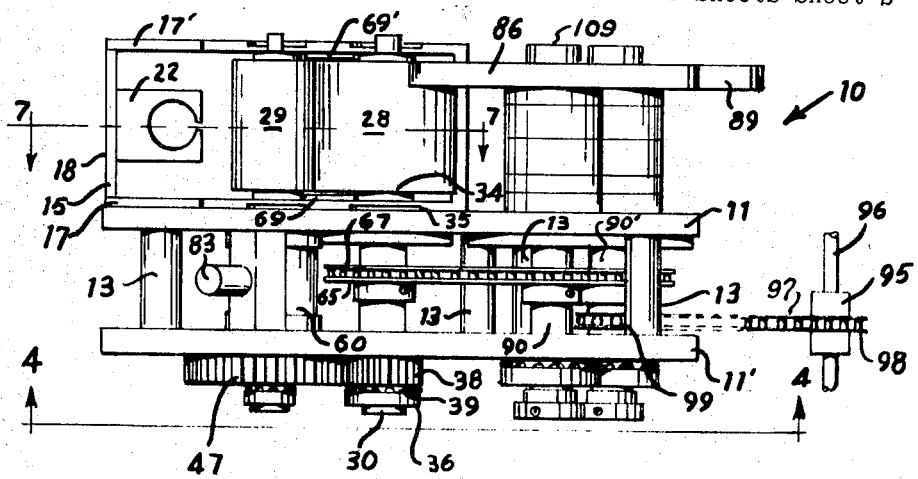
FIG. 3 is a plan view taken substantially along line 3—3 of FIG. 2 and showing a slip-clutch drive for the device.
Figure 9:
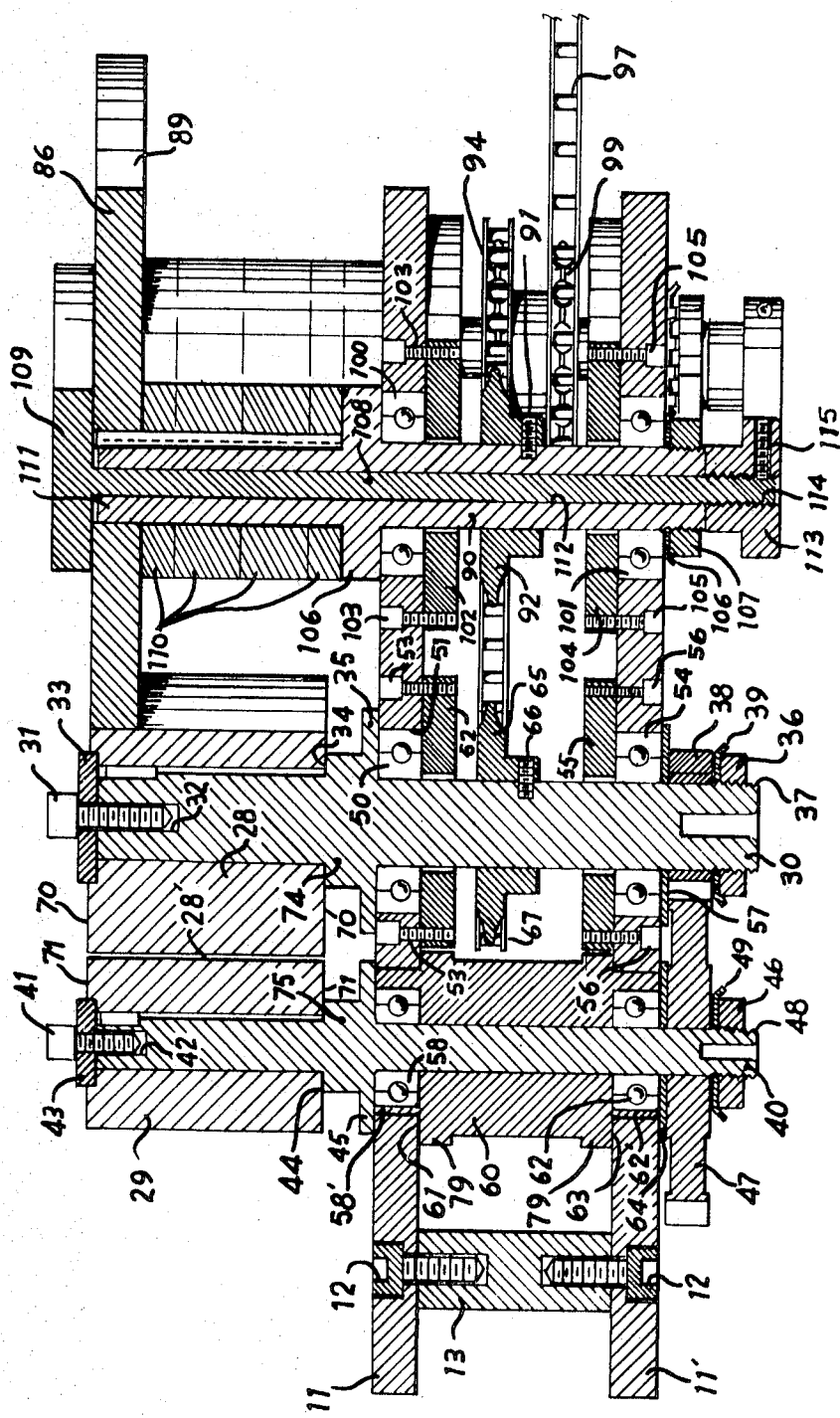
FIG. 9 is a cross sectional view taken substantially along line 9—9 of FIG. 4 and showing the manner in which the various components of the glue pot are constructed and assembled.

The improved glue pot 10 consists of a pair of identical spaced plates 11 and 11' which are held together by screws 12 (FIG. 9) which extend through suitable counterbored apertures (not numbered) in said plates and are received in tapped bores (not numbered) in spacers 13. The arrangement between screws 12 and one spacer 13 is shown in FIG. 9. However, it will be appreciated that the same relationship exists between all four of the spacers 13 (FIG. 3) and the screws 12 (FIG. 2) associated therewith.

A glue tub 15 (FIGS. 1, 3, 7 and 8) is mounted on plate 11 by means of screws 14 which extend only through apertures 16 in plate 17 of the glue tub. The glue tub 15 consists of mirror image counterpart side plates 17 and 17', the latter having apertures 16' therein in alignment with the counterpart apertures 16 which receive screws 14. The apertures 16' receive an elongated wrench or screwdriver which is used to engage the heads of screws 14. In addition, tub 15 includes a first end wall 18, a second end wall 19 and a bottom 20. All of the adjacent parts are suitably joined to each other, as by screws 21. Glue bottle holding blocks 22, which have aligned apertures 23 for receiving the neck 24 of an inverted glue bottle 25, are mounted on plate or end wall 18 as by the use of suitable screws, not shown. As can be seen from FIG. 7, whenever the level of the glue 26 in tub 15 falls, additional glue will be supplied from neck 24 until such time as the level of glue 26 reaches the lowermost portion of neck 24 and then flow will automatically stop. This provides an extremely convenient method of maintaining the glue level in tub 15 and further permitting only a very small amount of glue in the tub 15 at any specific time, which insures that the glue will always be clean and fresh because it is constantly being replaced.

Figure 7:
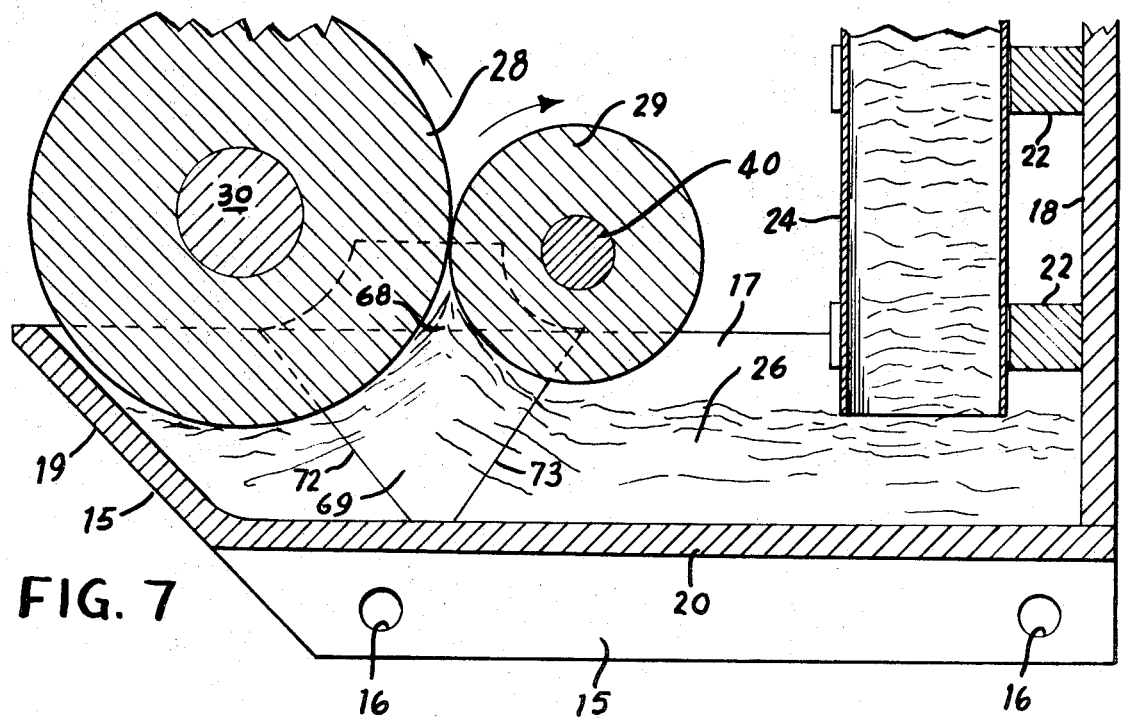
FIG. 7 is a fragmentary view partially in cross section taken substantially along line 7—7 of FIG. 3 and showing the relationship between the pick-up roller, the metering roller and the glue tub.

A glue pick-up roller 28 extends outwardly from plate 11, and the only portion of this roller which is submerged at any given time is the lower ⅜" to ½" thereof. Mounted for rotation next to roller 28 in the direction shown in FIG. 7 is a glue metering roller 29. As can be seen from FIG. 9, pick-up roller 28 is mounted on shaft 30 by means of screw 31 which is received in tapped aperture 32 and has a head, not numbered, which bears against washer 33, roller 28 being held between washer 33 and shoulder 34 on said shaft. Shaft 30 includes a collar portion 35 which abuts the outer surface of plate 11 to limit the position which shaft 30 assumes after nut 36 is tightened on its opposite threaded end 37 after gear 38 has been keyed in position with a spring 39 therebetween.

Glue metering roller 29 also extends outwardly from plate 11 and is mounted on shaft 40 by means of screw 41 which is received in tapped aperture 42 in said shaft, a washer 43 holding roller 29 in position in abutting relationship to shoulder 44. A collar 45 formed integrally with shaft 40 abuts plate 11 and therefore locates the position of roller 29 with respect thereto after nut 46 has been tightened, nut 46 holding keyed gear 47 in position because nut 46 is threaded onto threaded end 48 of shaft 40. A spring washer 49 is interposed between gear 47 and nut 46 to maintain the tension of the assembly at a proper value.

From FIG. 9 it can be seen that a first ball bearing 50 is located within aperture 51 of plate 11. This bearing is held against movement into the space between plates 11 and 11' by plate 52 which is attached to plate 11 by screws 53. Furthermore, bearing 50 is held against movement outwardly of plate 11 by collar 35 formed integrally with shaft 30. The other end of shaft 30 is mounted in ball bearing 54 which is mounted in plate 11'. In this respect a plate 55 is secured to plate 11' by screws 56 to prevent the ball bearing 54 from moving into the space between plates 11 and 11'. A washer 57 is interposed between gear 38 and plate 11' to prevent ball bearing 54 from working outwardly, that is, away from the space between plates 11 and 11'. As noted briefly above, the ball bearing mounting of this shaft 30 contributes to the ease of operation of the device.

Metering roller mounting shaft 40 is also mounted in ball bearings. In this respect, a first ball bearing 58 is mounted in plate 11 and held therein by collar 45 on shaft 40 and edge 61 of sleeve 60. Another ball bearing 62 is mounted on plate 11' for supporting shaft 40 and is held in position by edge 63 of sleeve 60 and washer 64 mounted between gear 47 and the outer surface of plate 11'. As noted above, the mounting of the shaft 40 in ball bearings contributes toward the ease of operation of the glue pot.

Figure 4:
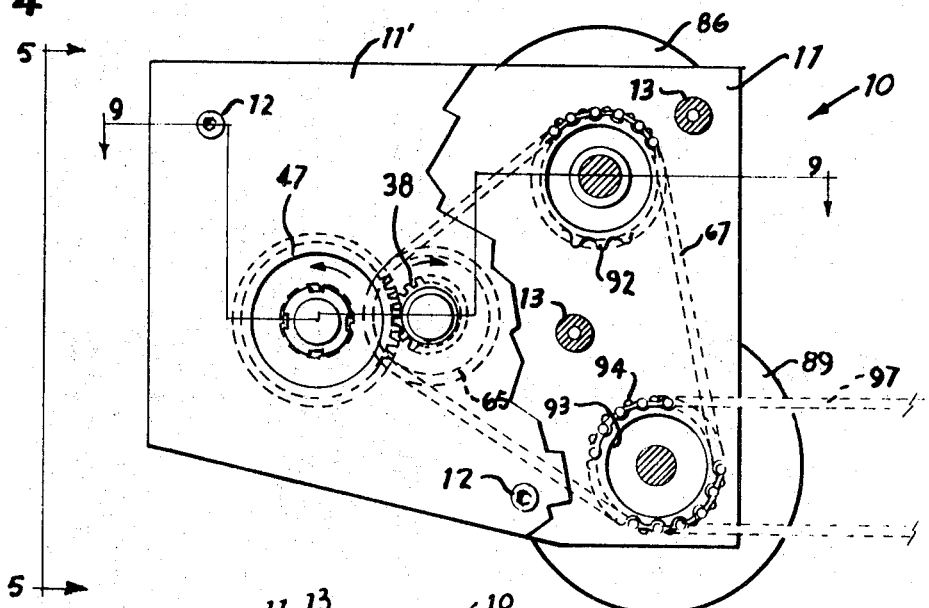
FIG. 4 is a fragmentary side elevational view taken along line 4—4 of FIG. 3 and showing the various chain drives and the gearing for the device.

At this point the manner in which rollers 28 and 29 operate will be described. A sprocket 65 is secured to shaft 30 by set screw 66. Sprocket 65 is driven by chain 67 (FIG. 4) which causes pick-up roller to travel in the direction of the arrow shown in FIGS. 1 and 7. Since gear 38 on shaft 30 is in mesh with gear 47 on shaft 40, the driving of shaft 30 in the above described manner will cause shaft 40 to rotate metering roller 29 in the direction of the arrow shown in FIGS. 1 and 7. Gears 38 and 47 are housed within cover 38' which is attached to plate 11'. Because of the ratio of gears 38 and 47 and because of the difference in diameters of rollers 28 and 29, metering roller 29 will travel at a much slower peripheral speed than pick-up roller 28. Therefore, there will be a wiping action at their most contiguous area. This in effect causes roler 29 to act as a scraper to meter the thickness of glue on roller 28, without the inherent diadvantages of a scraper, namely, there will be no glue build-up at the contiguous zone between rollers 28 and 29 because of the fact that roller 29 is traveling in the direction of the arrow and therefore will tend to keep glue from accumulating in this area. Furthermore, if there should be any glue globs, they will be passed through between the rollers and will not accumulate at the entry of the contiguous zone.

Figure 8:
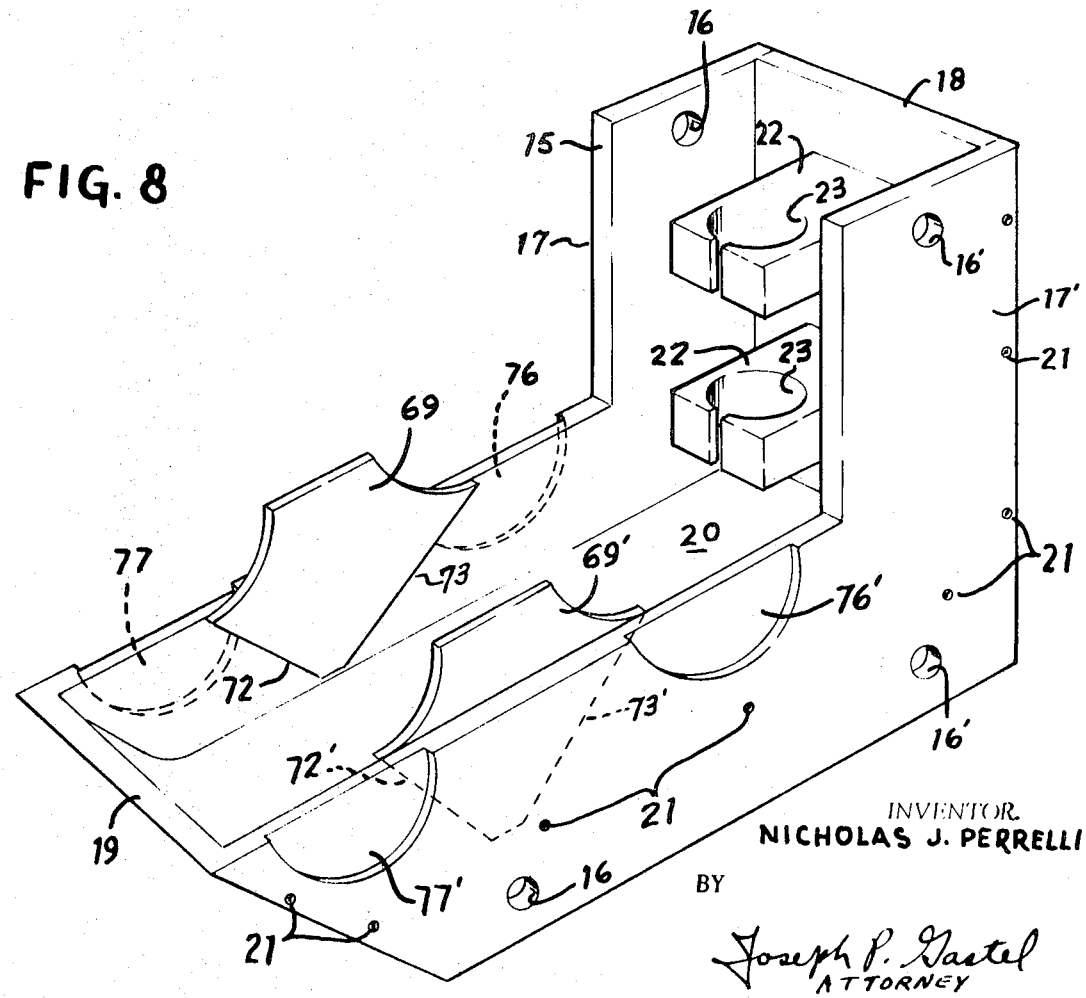
FIG. 8 is a perspective view of the glue tub showing the plates therein which limit the flow of glue along the sides of the pick-up and metering rollers.

Reference to FIG. 7 will show the manner in which the glue is taken up from tub 15 and carried by pick-up roller 28. The counterclockwise rotation of pick-up roller 28 and the clockwise rotation of metering roller 29 will suck up the glue therebetween and cause it to rise to a peak 68. However, the foaming of the glue in this zone will be held to a minimum and is virtually nonexistent because there is a tendency to keep air from the entry zone where peak 68 is located. In this respect it is to be noted from FIG. 3 that pick-up roller 28 and metering roller 29 are substantially the width of tub 15. Furthermore, mounted on plates 17 and 17' are side plates 69 and 69', respectively (FIG. 8). As can be seen from FIG. 3, these plates are very close to the opposite ends of rollers 28 and 29 and thus tend to prevent air from being drawn into the glue 26 in tub 15 by fast moving pick-up roller 28. Air below roller 29 will not be sucked into the glue between the rollers because the air cannot displace the glue which has been formed into peak 68. Thus there is very little tendency for air to be mixed with the glue, and foaming of the glue is minimized. Since the glue does not foam, it will not flow over the sides of tub 15. As noted briefly above, it is the adjustment of roller 29 relative to 28 which determines the thickness of the film of glue on roller 28.

As noted above, ball bearings 50 and 58 are mounted next to the glue tub. In the past, ball bearings could not be used because they would be damaged by the entry of glue which would destroy their relatively intricate mechanism. Therefore, as noted above, in the past sleeve bearings were utilized. However, the construction of the present invention virtually obviates the possibility of glue entering these bearings, thereby permitting the bearings, with their inherent advantages to be used. More specifically, the glue which is picked up by roller 28 and which also is transferred to some degree to metering roller 29 is confined to the outer cylindrical surfaces thereof. It is not permitted to accumulate on the opposite ends 70 and 71 (FIG. 9) of rollers 28 and 29, respectively. In this respect, it is to be noted that plates 69 and 69' (FIG. 8) have parallel edges 72 and 72', respectively. From FIG. 7 it can be seen that edges 72 and 72' cut across the opposite ends 70 of roller 28. As can best be seen from FIG. 7, considering the direction of rotation of roller 28, the edges 72 and 72' of plates 69 and 69' will act as wipers to limit the thickness of glue which can accumulate on ends 70. If this thickness is limited, there will be a minimal amount of glue on ends 70 at any particular time so that when roller 28 stops, there cannot be any great amount which moves by gravity toward shaft 30. In this respect, it will be noted that the glue on ends 70 will not move radially inwardly toward shaft 30 during rotation because of centrifugal force. As can be visualized from FIG. 7, the same relationship exists between the outer ends 71 of roller 29 and edges 73 and 73' of plates 69 and 69', namely, that they tend to permit a minimum accumulation of glue on the ends of the roller so that when the roller stops there will be very little glue on the roller which could flow by gravity onto the shaft.

At this point it is to be noted that there is a stepped portion 74 on shaft 30 (FIG. 9) which is interposed between collar 35 and roller 28. There is also a stepped portion 75 on shaft 40 which is interposed between roller 29 and collar 45. These stepped portions 74 and 75 space rollers 28 and 29 from plate 11 and assist in preventing any glue from entering bearings 50 and 58 which are continuous to collars 35 and 45, respectively. As can be visualized from FIG. 9, should there be any accumulation of glue on end surfaces 70 and 71 of rollers 28 and 29, respectively, facing toward plate 11, when this glue flows downwardly after rollers 28 and 29 stop, it will flow over stepped portions 74 and 75 but cannot enter bearings 50 and 58 because these are covered by collars 35 and 45 which are of larger diameter than both the bearings 50 and 58 and stepped portions 74 and 75. Thus there is a three-fold construction which prevents glue from entering bearings 50 and 58, namely, the wiper plates 69 and 69' which limit the amount of glue which can accumulate on the ends of rollers 28 and 29, and, secondly, the stepped portions 74 and 75 on the shafts 30 and 40 which would tend to prevent the glue from entering bearings 50 and 58 and thirdly the collars 35 and 45 which enclose the bearings against the entry of glue. Because of this relationship relative to bearings 50 and 58 and because of the protecting relationship described above which encloses bearings 54 and 62 at the other ends of shafts 30 and 40, respectively, against entry of glue, ball bearings can be used to support shafts 30 and 40.

At this point it is to be noted that side wall 17 of tub 15 contains cutouts 76 and 77 therein (FIG. 8). These cutouts receive collars 45 and 35, respectively, when plate 17 of tub 15 is installed in abutting relationship to the outer surface of plate 11. As can be seen from FIG. 8, cutouts 76 and 77 in plate 17 have counterparts 76' and 77' in plate 17' and these cutouts accommodate collars 45 and 35, respectively, in the event that shafts 40 and 30 are reversed to cause the rollers to be mounted outwardly of plate 11' when tub 15 is mounted on plate 11'.

Figure 6:
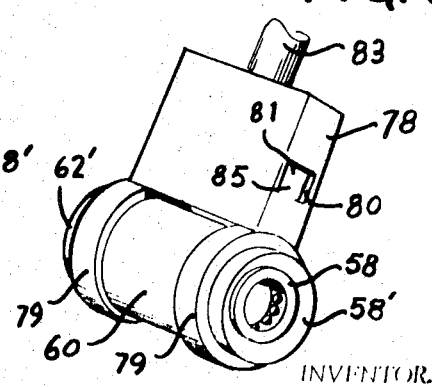
FIG. 6 is a fragmentary perspective view of the locking mechanism and mounting for the meter roller.

As noted briefly above, the thickness of the glue film on pick-up roller 28 depends on the spacing between it and metering roller 29. This spacing can be adjusted rapidly in an extremely simple manner to meet different requirements. Sleeve 60 (FIGS. 6 and 9) mounts ball bearings 58 and 62 eccentrically within cylindrical ends 58' and 62', FIGS. 6 and 9, which are received in circular bores, not numbered, in plates 11 and 11'. Since bearings 58 and 62 are mounted eccentrically relative to portions 58' and 62', any rotation of the latter within the apertures in the plates in which they are located will cause bearings 58 and 62 to approach and recede from shaft 30 on which applicating roller 28 is mounted. This will accordingly cause metering roller 29 to approach and recede from pick-up roller 28, as required. Thus, by moving metering roller 29 toward and away from roller 28, the space 28' (FIG. 9) therebetween can be adjusted to meter the thickness of the glue film which is carried upwardly by the surface of roller 28.

Figure 5:
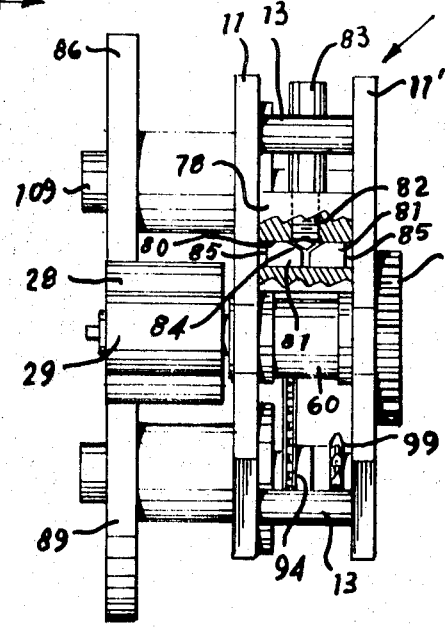
FIG. 5 is an end elevational view taken substantially along line 5—5 of FIG. 4 with portions partially broken away to show the mechanism for locking the metering roller in any desired adjusted position.

In order to lock metering roller 29 in any desired adjusted position, a wedge arrangement is provided. In this respect, a housing 78 (FIGS. 5 and 6) is rigidly secured to collars 79 on roller 60. Housing 78 contains a slot 80 therein which houses opposed wedge members 81 and guides them for movement substantially perpendicularly to plates 11 and 11'. Threaded into the upper end of housing 78 is a screw portion 82 of handle 83 with the screw portion terminating at a wedge 84 which coacts with inclined faces on wedges 81. When screw 82 is tightened into housing 78, the wedged face 84 thereof will spread wedges 81 and cause their outer ends 85 to bear against the facing side walls of plates 11 and 11' to thereby lock metering roller 29 in any adjusted position thereof. It can thus be seen that the metering of the film of glue on roller 28 may be accomplished rapidly in an extremely simple manner by merely loosening screw 82 by manipulating handle 83, shifting the handle back or forth to rotate sleeve 60 to effect the proper adjustment and then retightening the screw 82.

Figure 1:
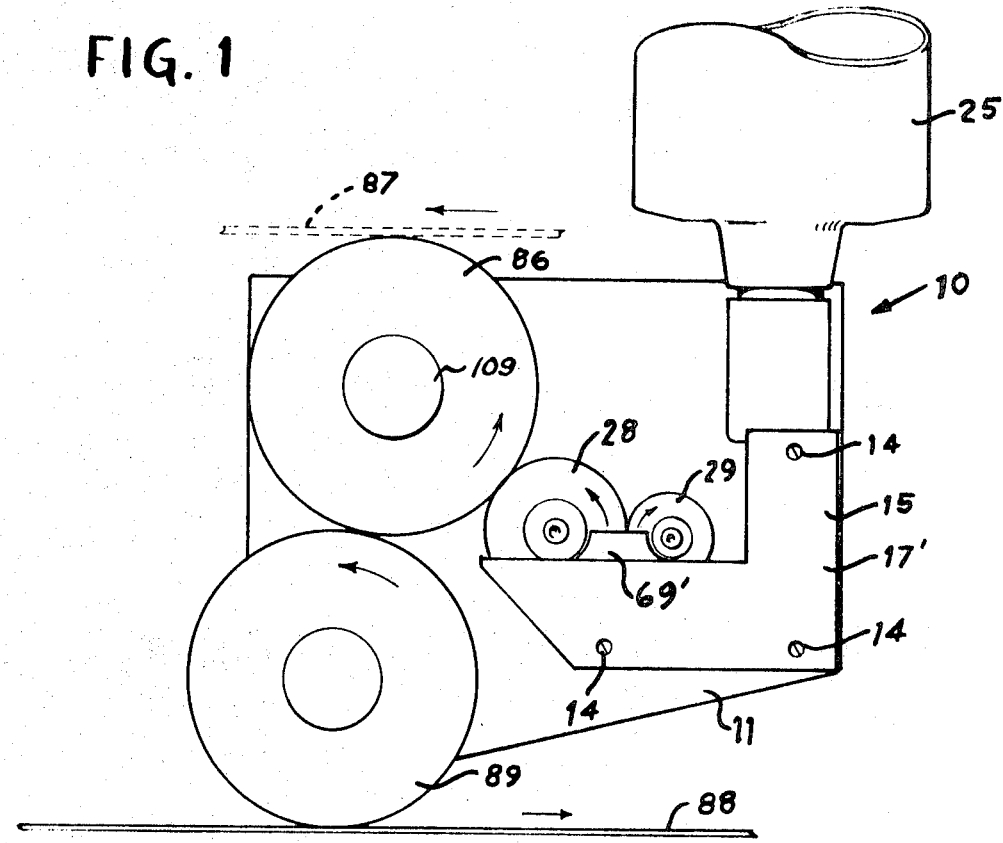
FIG. 1 is a side elevational view of an improved glue pot of the present invention.

The glue film on pick-up roller 28 is transferred to upper glue applying roller 86 which travels in counter-wiping relationship relative to pick-up roller 28, as can be seen from FIG. 1. This counter-relationship prevents spraying because the glue passing between roller 28 and wheel 86 is not thrown outwardly. Roller 86 picks the glue off of the surface of roller 28 as the surfaces travel in opposite directions. If the glue pot 10 is to be located under parts to be glued, that is, if the part to which glue is to be applied is located at 87 and travels in the direction of the arrow, wheel 86 will apply the glue. On the other hand, if the glue pot 10 is located above the workpiece 88 to which glue is to be applied, the glue is transferred from the surface of roller 86 to the surface of roller 89 which travels in counter-wiping relationship thereto and it is roller 89 which applies the glue to workpiece 88 traveling in the direction of the arrow. In the event that roller 89 applies the glue to the workpiece, roller 86 then merely acts as a transfer roller. Again, the relationship between rollers 86 and 89 is that of counter-rotation so that there is no spraying, as would be the case if their surfaces at the area of transfer were traveling in the same direction.

The above described counter-wiping relationship between pick-up roller 28 and roller 86 and between rollers 86 and 89 is achieved by means of a simple chain drive effectively linking these members. Roller 86 is mounted on shaft 90. Keyed to shaft 90 by means of set screw 91 is a sprocket 92. Roller 89 is mounted on shaft 93 which in turn mounts sprocket 94. Chain 67 (FIGS. 3 and 4) engages sprockets 92 and 94 associated with rollers 86 and 89, respectively, and sprocket 65 (FIG. 9) which drives pick-up roller 28. Because of the direct chain drive between the shafts on which the sprockets are mounted, there will be the above described counter-wiping relationship between adjacent rollers.

All of the rollers described above may be driven from a suitable slip-clutch 95 (FIG. 3) driven from any suitable shaft 96 on the machine. A chain 97 encircles a sprocket 98 associated with slip-clutch 95 and sprocket 99 on shaft 90. Since all of the shafts which are driven are mounted in ball bearings as described in detail above, and as will be further described hereinafter, in the event any foreign material such as cloth or a piece being glued or the finger of a person gets caught between the rollers of any part of the apparatus, the slip-clutch 95 will slip and there will be no injury to either the person or the machine. Slip-clutch 95 may be of any conventional construction wherein the engaging surfaces are pressed together under a predetermined spring tension.

Figure 10:
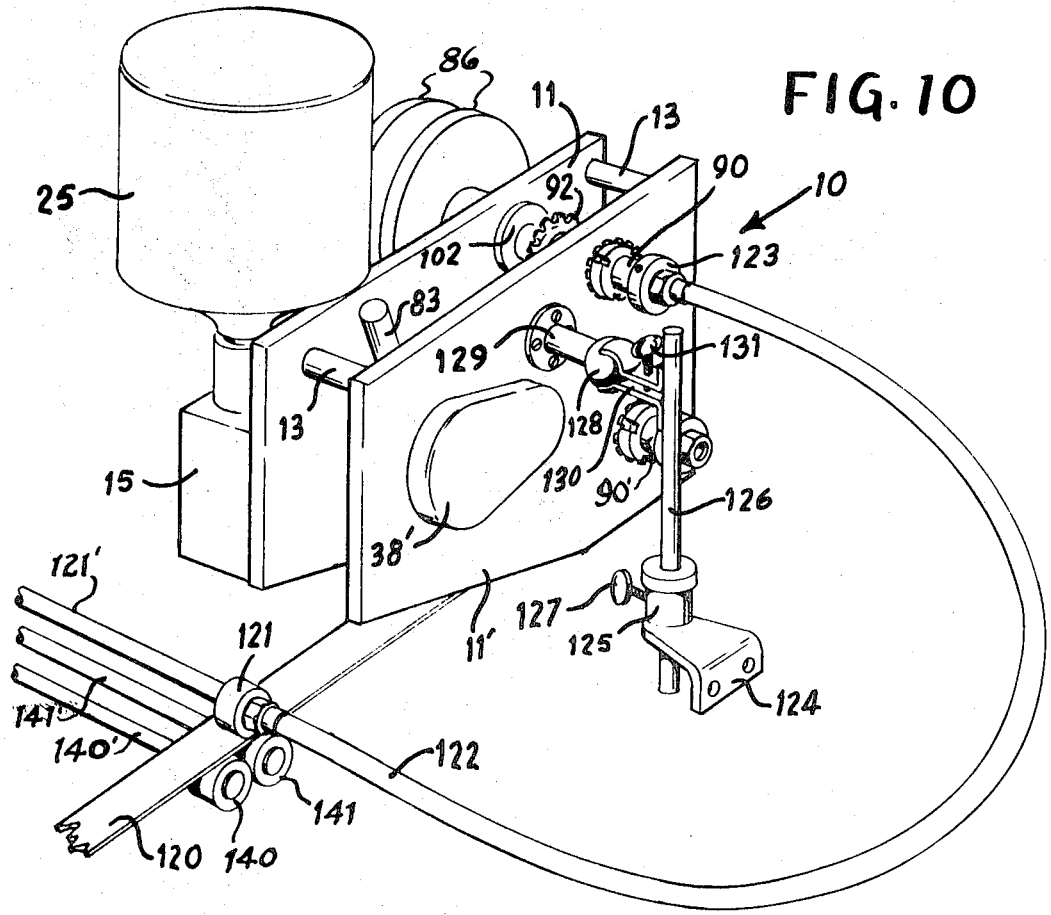
FIG. 10 is a perspective view showing an improved cable drive to the glue pot and an improved universal mounting therefor.

The manner in which rollers 86 and 89 are mounted is disclosed in FIG. 9, the mounting for roller 89 being omitted in the interest of clarity and brevity, it being appreciated that its mounting is identical in all respects to the mounting for roller 86 which will be described. More specifically, shaft 90 (FIG. 9) is received within bearings 100 and 101 in plates 11 and 11', respectively. Bearing 100 is held against movement into the space between plates 11 and 11' by plate 102 which is attached to the inside of plate 11 by screws 103. Bearing 101 is prevented from moving into the space between plates 11 and 11' by plate 104 which is attached to plate 11' by screws 105. Shaft 90 includes a collar 106 formed integrally therewith which abuts plate 11 and therefore confines bearing 100 against moving outwardly away from the space between plates 11 and 11'. A spring 106 is interposed between bearing 101 and nut 107 which is threaded onto shaft 90. Bearing 101 is press-fitted into plate 11'. In order to secure wheel 86 to shaft 90, central shaft 108 having cap 109 is utilized. In this respect, a plurality of spacers 110 are keyed on the outer portion 111 of shaft 90 outwardly of collar 106. Thereafter, roller 86 is mounted on portion 111 and shaft 108 is inserted into bore 112 of shaft 90. Thereafter, nut 113 is threaded onto end 114 of shaft 108 until head 109 firmly holds wheel 86 in position. Set screw 115 is then tightened to secure the assembly. It will be appreciated that by the use of different combinations of spacers 110, roller 86 can be located at any desired position on shaft 90. Furthermore, a plurality of rollers such as 86 may be mounted on portion 111 of shaft 90 in any desired pattern, as shown in FIG. 10. All of the foregoing which was described in detail above relative to shaft 90 mounting roller 86 is equally applicable to the corresponding shaft which mounts roller 89.

As noted briefly above, one advantage of the instant construction is that the glue pot 10 can be used mounted in a right-handed or a left-handed manner or it can apply glue by wheel 86 or 89'. The manner in which glue is transferred to either of rollers 86 or 89 for top or bottom glue applying was described in detail above. It will also be appreciated that all of the rollers can be mounted so as to extend outwardly of plate 11, as shown and described in detail above relative to FIG. 9 or they may be mounted to extend outwardly of plate 11'. The foregoing can be achieved in an extremely simple manner with a minimum of effort. In order to mount the various rollers so that they extend outwardly of plate 11', it is merely necessary to unscrew nuts 36 and 46 associated with shafts 30 and 40, respectively. This will permit these shafts to be slid out from the bearings which hold them. Thereafter, these shafts are inserted into the bearings in plate 11' first and thereafter through the bearings in plate 11 and thereafter the nuts 36 and 46 are again mounted on said shaft proximate plate 11. Generally the same procedure is followed with respect to shaft 90 and the other shaft which mounts roller 89. In this respect all that is necessary is to remove nut 113 after loosening set screw 115, and remove nut 107. Thereafter shaft 90 can be withdrawn from bearings 100 and 101 and reinserted into these bearings so that it extends in an opposite direction from which it extended originally. Insofar as the glue tub 15 is concerned, it is removed by merely unloosening screws 14 which permits the glue tub to be taken off of plate 11. Thereafter, it is mounted on plate 11' with plate 17' of glue tub 15 in engagement with plate 11' whereas previously it was plate 17 of glue tub 15 which was mounted in contiguous relationship to plate 11.

Cleaning of the glue pot is extremely simple and can be done rapidly because of the above described construction. More specifically the amount of glue in tub 15 is relatively small. Therefore, when bottle 25 is removed incidental to cleaning, the amount of glue which is wasted by being cleaned from tub 15 is negligible. To effect cleaning, bottle 25 is removed and tub 15 is detached by unloosening screws 14. The tub can then be cleaned in any convenient manner. Thereafter, rollers 29, 28, 86 and 89 are rotated and can be wiped clean with a damp cloth containing any suitable solvent. It is to be especially noted that there is no need to disassemble the glue pot 10 any further than described above or to do anything further inasmuch as the glue does not penetrate the bearings or the internal portions of the glue pot.

In FIG. 10 an alternate embodiment of the present invention is disclosed. This embodiment includes structure which permits the glue pot 10 to be driven from a belt drive 120 of the machine on which glue pot 10 is mounted. More specifically, pulley 121 is mounted in engagement with belt 120 and forms the end of a cable unit 122, the other end of which is attached to shaft 90 by a suitable slip clutch 123. In the embodiment of FIG. 10 the drive from the slip-clutch 25 through chain 98 is not used. Instead of this, it is cable drive 122 which drives the unit through slip-clutch 123. In all other respects, except as noted above, glue pot 10 may be identical to that described above with respect to FIGS. 1 through 9. Belt 120 is clamped between pulley 121 and pulleys 140 and 141, said pulleys being mounted on shafts 121', 140' and 141' respectively. Suitable mechanism, not shown, mounts shafts 121', 140' and 141' for forcing pulley 121 towards pulleys 140' and 141', to adjust the clamping pressure on belt 120.

In addition, a mounting is shown for placing glue pot 10 in any desired orientation relative to the machine with which it is associated. In other words, a universal mounting is disclosed which includes a bracket 124 which is attached to any suitable part of the machine, bracket 124 having affixed thereto a base 125 having a cylindrical bore therein for receiving cylindrical shaft 126 which can be tightened in any desired radial or axial position by set screw 127 extending through base 125 and into engagement with shaft 126. In other words, it can be seen that shaft 126 can be moved up and down or pivoted on its axis, thereby in this respect adjusting the elevation and the horizontal orientation of glue pot 10. In addition, a ball joint is provided between shaft 126 and glue pot 10. More specifically, a spherical ball member 128 is rigidly attached to plate 11 by means of rod 129, which can be attached to either plate 11 or 11'. Clamp 130 has two halves which are drawn together by screw 131 to lock the ball 128 relative to shaft 126 in any desired orientation. It can readily be seen therefore that by adjusting both the azimuth and elevation of shaft 126 and by adjusting the relative position between ball 128 and clamp 130, glue pot 10 can be oriented in any desired position. The foregoing universal mounting is possible because of the cable drive which does not require any set relationship between the glue pot 10 and the machine on which it is mounted in order to effect a satisfactory driving relationship as would be the case with a chain drive such as discussed above with respect to the other embodiments.

As can be seen from FIG. 10, a plurality of rollers 86 may be mounted on shaft 90, and a plurality of rollers 89 may be mounted on shaft 90'. The rollers on each shaft can be located in any desired orientation, by the use of spacer collars 110, to provide a series of glue stripes on the carton passing through the machine.

While preferred embodiments of the present invention have been disclosed, it will readily be appreciated that it is not limited thereto, but may otherwise be embodied within the scope of the following claims:

1. A glue pot comprising a frame, a tub for containing glue, a pick-up roller, first means including first ball bearing means for mounting said pick-up roller means for rotation on said frame, applying roller means oriented in glue transfer relationship relative to said pick-up roller means, second means including second ball bearing means for mounting said applying roller means on said frame, means for shielding said first and second ball bearing means against the entry of glue, a metering roller, third means including third ball bearing means for mounting said metering roller on said frame, means for shielding said third ball bearing means against the entry of glue, said frame comprising first and second spaced plates, said first ball bearing means comprising a first ball bearing mounted in said first plate and a second ball bearing mounted in said second plate, said first means including a first elongated shaft mounted in said first and second ball bearings, said second ball bearing means comprising a third ball bearing mounted in said first plate and a fourth ball bearing mounted in said second plate, said second means including a second elongated shaft mounted in said third and fourth ball bearings for mounting said applying roller means, said third ball bearing means comprising fifth and sixth ball bearings mounted in said first and second plates, respectively, said third means including a third shaft mounted in said fifth and sixth ball bearings for mounting said metering roller, a first sprocket on said first shaft and a second sprocket on said second shaft, chain means coupling said first and said second sprockets for causing said first and second sprockets to rotate in the same direction, and gear means coupling said first and third shafts for causing said first and third shafts to rotate in opposite directions, said applying roller means including first and second rollers with said first roller being mounted on said second shaft, said glue applying roller means including a fourth shaft for mounting said second glue applying roller, seventh and eighth ball bearings mounted in said first and second plates, respectively, for mounting said fourth shaft with said second applying roller in contiguous glue transfer relationship to said first glue applying roller, a third sprocket mounted on said fourth shaft, and said chain means being coupled to said third sprocket to cause said fourth shaft to rotate in the same direction as said second shaft.

2. A glue pot as set forth in claim 1 wherein said first and second sprockets and said chain means and said gear means are located between said first and second plates, and wherein said first, second, and third shafts extend outwardly of said first plate in cantilever fashion, and wherein said first, second, and third rollers are located on the opposite side of said first plate from said chain means and said gear means.

References Cited

UNITED STATES PATENTS

| 1,324,474 | 12/1919 | Staude | 118—262 |
| 1,569,751 | 1/1926 | Higgins | 308—187.1 |
| 1,654,214 | 12/1927 | Evans | 118—228 X |
| 1,812,385 | 6/1931 | Troyer | 308—187.1 |
| 1,849,540 | 3/1932 | Gosgrove | 118—262 X |
| 2,046,199 | 6/1936 | MacDonald | 118—228 X |
| 2,265,990 | 12/1941 | Ashworth | 118—262 X |
| 3,077,064 | 2/1963 | Russell | 118—228 X |
| 3,303,814 | 2/1967 | Nitchie | 118—262 X |
| 3,116,611 | 1/1964 | Lacey | 64—30 |
| 666,576 | 1/1901 | Tily | 118—262 X |
| 2,243,604 | 5/1941 | Parkinson | 118—262 |
| 3,343,484 | 9/1967 | Dahlgren | 118—262 X |
| 3,392,702 | 7/1968 | Warner | 118—262 X |

FOREIGN PATENTS

| 376,639 | 7/1932 | Great Britain | 15—50 |

LAVERNE D. GEIGER, Primary Examiner

R. I. SMITH, Assistant Examiner